3,156,612
METHOD OF INHIBITING GROWTH OF FUNGI AND BACTERIA WITH ESTER OF ACETYLENIC ACID AND POLYOL
John M. Butler, Dayton, Ohio, and Lee A. Miller, Kirkwood, Mo., assignors to Monsanto Company, a corporation of Delaware
No Drawing. Filed Jan. 22, 1963, Ser. No. 253,062
9 Claims. (Cl. 167—22)

The present invention relates to esters and more particularly provides esters of certain di- or polyhydric alcohols and certain acetylenic acids and methods of inhibiting the growth of fungus and bacteria microorganisms.

An object of this invention is to provide, from the acetylenic acids, esters having biological toxicant utility, i.e., compounds which will serve as the essential effective ingredients of fungicidal and bactericidal compositions. The method of inhibiting the growth of fungus and bacteria microorganisms and of plant life wherein there are employed compositions comprising the presently provided esters is a further objective of the invention.

These and other objects hereinafter defined are provided by the invention wherein there is used new and valuable esters of the formula

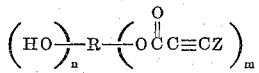

where R is selected from the class consisting of hydrocarbon radicals and halohydrocarbon radicals of from 2 to 18 carbon atoms and is linked through diverse carbon atoms thereof to the remainder of the molecule of which it forms a part, $n$ is an integer of from 0 to 3, $m$ is an integer of from 1 to 4 and the sum of $n$ plus $m$ is from 2 to 4, and Z is selected from the class consisting of hydrogen, alkyl radicals of from 1 to 5 carbon atoms and aryl radicals of from 6 to 10 carbon atoms.

These acetylenic esters are prepared by reaction of a polyhydric compound of the formula $R(OH)_x$ wherein R is the above defined hydrocarbon or halohydrocarbon radical and $x$ is an integer of from 2 to 4 with a compound selected from the class consisting of acetylenic acids of the formula $ZC{\equiv}COOH$ wherein Z is as above defined and acyl halides and anhydrides thereof, employing the reaction conditions which will be hereinafter described.

The presently useful di- or polyhydric compounds may be the aliphatic hydrocarbon or halohydrocarbon polyols having from 2 to 4 hydroxy radicals and a total of from 2 to 18 carbon atoms, e.g., the glycols such as Ethylene glycol,
1,2- or 1,3-propanediol,
1,2-, 1,3-, 1,4- or 2,3-butanediol,
1,3-, 1,4-, 1,5-, 2,3-, or 2,4-pentanediol,
2-butene-1,2-diol,
2-butene-1,4-diol,
2-bromo-1,3-propanediol,
2-fluoro-1,3-propanediol,
2-hydroxymethyl-1,2,3-propanetriol,
2-butyne-1,4-diol,
2-methyl-1,5-pentanediol,
1,4-dichloro-2,3-butanediol,
2,3-dibromo-1,4-butanediol,
2- or 4-chloro-1,3-butanediol,
2,4-dimethyl-2,4-pentanediol,
1,1,1-trifluoro-2,3-butanediol,
2,2-diethyl-1,4-butanediol,
2-pentyn-1,4-diol,
2-pentene-1,5-diol,
2-propyl-1,3-butanediol,
2-chloro-1,5-pentanediol,
5-iodo-1,4-hexanediol,
1,4-hexanediol,
5-methyl-1,2-hexanediol,
2-ethyl-1,3-hexanediol,
2-tert-butyl-3,3,4,4-tetramethyl-1,2-pentanediol,
4-methyl-1,4-hexanediol,
1,6-hexanediol,
3,3-dimethyl-1,6-hexanediol,
2,4-dimethyl-3-hexene-2,5-diol,
2,3-, 2,4-, 2,5-, or 3,4-hexanediol.
1,2,5-, 1,2,6-, 1,3,5-, 1,4,5-, or 2,3,4-hexanetriol,
1-chloro-2,5-dimethyl-3-hexyne-2,5-diol,
1,2,3,6-hexanetetrol,
2,4-hexadiyne-1,6-diol,
1,6-, 1,7-, 2,4-, or 2,5-heptenediol,
2-heptene-1,6-diol,
1-chloro-2,5-dimethyl-3-heptyne-2,5-diol,
5-ethyl-3-methyl-2,4-heptanediol,
4-ethyl-1,4,5-heptanetriol,
3,6-dimethyl-2,3,6-heptanetriol,
1,2-, 1,3-, 1,4-, 1,8-, 2,4-, 2,7-, or 4,5-octanediol,
2-methyl-2-octene-1,4-diol,
3-(hydroxymethyl)-1,5-pentanediol,
2,4,4,5,5,7-hexamethyl-3,6-octanediol,
2,7-dimethyl-4-octane-2,7-diol,
2-butyl-2-ethyl-4-methyl-1,3-octanediol,
2,3,6,7-tetramethyl-2,3,6,7-octanetetrol,
(3-heptafluoropropyl)-1,5-pentanediol,
1,9-nonanediol,
1,2- or 1,10-decanediol,
2,3,8,9-tetramethyl-2,3,8,9-decanetetrol,
1,2- or 1,12-dodecanediol,
5-decyne-4,7-diol,
4,7-dipropyl-5-decyne-3,4,7,8-tetrol,
5,9-dimethyl-8-decene-1,5-diol,
5,8-diethyl-6,7-dodecanediol,
9-octadecene-1,12-diol,
9,10- or 1,12-octadecanediol,
1,9,10-octadecanetriol,
1,9- or 1,11-undecanediol;
1,13-tridecanediol;
1,2-tetradecanediol,
1,2- or 1,16-hexadecanediol,
16-methyl-1,2-heptadecanediol,
1,2- or 1,12-octadecanediol,
2-methyl-1,2-propanediol,
2-butyl-2-ethyl-1,3-propanediol,
2,2-diethyl-1,3-propanediol,
2-ethyl-2-(hydroxymethyl)-1,3-propanediol,
2-(hydroxymethyl)-2-methylpropanediol,
2-isobutyl-1,3-propanediol,
Glycerine,
2-ethyl-1,3-butanediol,
2,2-diethyl-1,4-butanediol,
2,2,3,3-tetramethyl-1,4-butanediol,
Pinacol,
Erythritol,
Pentaerythritol,
1,2,3- or 1,2,4-butanetriol,
3-neopentylidene-1,5-pentanediol,
2-tert-butyl-1,2,5-pentanetriol,
1,3,4-, or 1,3,5- or 2,3,4-pentanetriol, etc.

Examples of benzenoid di- or polyols which are useful for esterification with the acetylenic acid, halide or anhydride are o, m, or p-xylene-α,α′-diols,
3,6-dimethyl-o-xylene-α,α′-diol,
α,α′-dimethyl-p-xylene-α,α′-diol,1,6-diphenyl-1,6 - hexanediol,
6-phenyl-4,5,6-decanetriol,
1,2-diphenyl-1,2-ethanediol,
1- or 2-phenyl-1,2-propanediol, 2-methyl-1-phenyl-1,2-propanediol,
2-di-o-tolylmethyl-1,3-propanediol,
1- or 2-phenyl-1,2,3-propanetriol,
2-methyl-3-phenyl-1,2-butanediol,
1,4- or 2,2-diphenyl-1,4-butanediol,
2,3-dimethyl-1,4-diphenyl-1,4-butanediol,
3-methyl-1-phenyl-1,2,3-butanetriol,
1,6- or 1,8-naphthalenedimethanol,
$\alpha$-,$\alpha^3$-mesitylenediol,
$\alpha^1\alpha^3\alpha^5$-mesitylenetriol-o-benzenediethanol,
$\alpha,\alpha'$-dimethylhydrobenzoin,
2,3-dibenzylidene-1,4-butanediol,
1,1-bis(p-bromophenyl)-2-butyne-1,4-diol,
1-phenyl-1,5-pentanediol,
Hydroquinone,
Resorcinol,
2,6-dichloroesorcinol,
Pyrocatechol,
4-tert-butyl-5-chloropyrocatechol,
4-dodecylpyrocatechol,
Pyrogallol,
phloroglucinol,
1,2,4-benzenetriol,
Benzenetrimethanol,
1,2,3,4- or 1,2,3,5-benzenetetrol,
1,2,4,5-benzenetetramethanol,
m,m'- or p,p'-biphenol,
4,4'dichloro-o,o'-biphenol,
2,2',6,6'-tetraisopropyl-p,p'-biphenol,
1,8- or 1,2-naphthalenediol;
2-bromo-3-methyl-1,4-naphthalenediol,
4,4'-p-terphenyldiol, etc.

Alicyclic hydroxy compounds of present utility are, for example,
cyclohexyl-1,2-ethanediol,
(1-hydroxycyclohexyl)-1,2-ethanediol,
1-cyclohexyl-2-methyl-1-phenyl-1,3-propanediol,
5-cyclohexyl-2-methyl-2,3-pentanediol,
1,2- or 1,3-, or 1,4-cyclohexanediol,
4-cyclopentyl-1,2-cyclohexanediol,
1,2-dimethyl-1,2-cyclohexanediol,
1,1-cyclopropanedimethanol,
1,2,2,3,5,5-hexamethyl-1,3-cyclohexanediol,
2-cyclohexyl-1,4-cyclohexanediol,
1,2,3,4-cyclohexanetetrol,
1,2,3-cyclohexanetriol,
p,p'-bicyclohexanol,
1-methyl-1,2,4-cyclohexanetriol,
1,1- or 1,2-cyclopentanedimethanol,
1,2-cyclopentanediol,
3-cyclopentene-1,2-diol,
1,2-dimethyl-1,2-cyclopentanediol,
Decahydro-2,7-naphthalenediol,
Decahydro-2,3-naphthalenedimethanol,
Octahydro-4,4,7-trimethyl-1,7,8A-(1H)-naphthalenetriol,
(bicyclohexyl)-1,1'-dimethanol,
2-(1-hydroxycyclohexyl)-5-methyl-3-hexene-2,5-diol,
4-cyclohexylresorcinol,
1,3,5-cyclohexanetriol,
3,6-dibromo-4-cyclohexene-1,2-diol,
4,5-dimethyl-4-cyclohexene-1,2-dimethanol, etc.

The acetylenic acids which are reacted with the polyols to give the presently provided esters have the formula ZC≡COOH wherein Z is selected from the class consisting of hydrogen, alkyl radicals of from 1 to 5 carbon atoms and aromatic hydrocarbon radicals of from 6 to 10 carbon atoms. Acyl halides or anhydrides of such acetylenic acids may be used instead of the acids. The following are some of the presently useful acetylenic acid compounds: propiolic acid, propiolyl chloride, bromide, idide or fluoride, propiolic anhydride, tetrolic acid, 2-pentynoic acid, 2-hexynoic acid, 2-heptynoic acid, 2-octynoic acid, 2-octynoyl chloride, trimethyltetrolic acid, phenylpropiolic acid, phenylpropiolyl chloride, 2,3,4,6-tetramethylphenyl-propiolic acid, o-, m- or p-tolylpropiolic acid, 1-naphthalenepropiolic acid, 4-phenyl-2-butynoic acid, etc.

The propiolyl halide to be used as one of the reactants of the esterification reaction may be prepared by reacting propiolic acid with benzoyl halide. The reaction between benzoyl halide and propiolic acid is almost instantaneous at ambient temperature and being an equilibrium reaction it is desirable to remove one of the product materials during the course of the reaction in order to shift equilibrium in the desired direction. In this respect propiolyl halide is relatively more volatile than other materials in the reaction mass and for that reason the temperature of reaction is controlled to cause substantial vaporization of the propiolyl halide during the course of the reaction. The preparation of propiolyl chloride according to this procedure forms the subject of the copending application of Lee A. Miller, Serial No. 6,344, filed February 3, 1960. The propiolyl chloride so formed may be led directly, without intermediate recovery into a solution or suspension of the polyol which is to be esterified according to this invention.

Reaction of the polyhydroxy compound with the alkynoic acid, or acyl halide or anhydride thereof takes place readily by simply contacting the acidic compound with the polyhydroxy compound at ordinary or increased temperature and in the presence of an inert diluent or solvent. Advantageously, when the acetylenic acid is used, reaction is effected at a temperature of from, say 50° C. to 120° C. and the heating within this temperature is conducted until the desired extent of esterification has occurred. Using the acyl halide, optimum conditions include operation at temperatures which may be as low as, say, —10° C., i.e., extraneous heating is unnecessary; instead, cooling may be employed. The ratio of acid compound to polyhydroxy compound which is employed will, of course, depend upon the number of hydroxy groups of the polyol which it is desired to esterify, and it is advantageous to employ the reactants in such stoichiometric proportion. However, a slight excess of either the polyol or the acid compound may be used. Generally, the reaction proceeds with primary formation of the monoester and subsequently the other hydroxy radical or radicals of the polyol are progressively esterified, provided enough of the alkynoic acid compound is present in the reaction mixture. Accordingly, the nature of the ester product will depend to some extent upon reaction time. Thus, in order to obtain a product which is substantially a mono-ester, the reaction is discontinued when the quantity of evolved by-product is that calculated for mono-esterification. In this case, any excess of alkynoic acid compound which is present is removed from the reaction mixture, e.g., by distillation or solvent extraction. Thus, whether or not the reactants are present in the stoichiometric proportions, the reaction time is a factor in obtaining the desired degree of esterification. However, it does not appear to be a substantial factor in obtaining good yields of the completely esterified product.

The presence of an inert diluent or solvent and operation at a temperature which is below 120° C. are both recommended for obtaining the presently provided, well-characterized esters in good yields. When the temperature is increased and the diluent is omitted, there are produced reaction products which do not at all resemble the well-defined, thinly liquid or crystalline esters of the present invention; instead, the products are either heterogeneous masses, e.g., resinous materials interspersed with waxy products, or black tars, heavy oils or resins, depending upon the nature of the individual reactants and upon the extent of variation from the reaction conditions which we have found to be conductive to the production of the mono-, di-, tri- or tetra-alkynoates or arylalkynoates. Use of temperatures below 120° C. and operation in the presence of a diluent apparently permits substantial limitation of the reaction to esterification, rather than to other reactions which could be expected to occur with the highly active triple bonded acidic compounds and the bifunctional hydroxy compounds, e.g., addition of the hydroxy radical across the triple bond of the acidic component, polymerization of the acidic compound, linear condensation of the polyol through esterification, etc.

Inert liquid diluents which are useful for the present purpose are liquid hydrocarbons generally, halogenated hydrocarbons, ethers, or ketones, e.g., benzene, toluene, xylene, hexane, petroleum spirits, dichlorobenzene, ethylene dichloride, carbon tetrachloride, tetrachlorohexane, dioxane, isopropyl ether, acetone, butanone, etc. The solvent or diluent, of course, serves to facilitate uniform distribution of the reactants throughout the reaction medium. When reacting an acetylenic acyl halide with the polyol, it is preferred to employ a solvent or diluent which minimizes the tendency of the hydrogen halide by-product to react with the triple bond of the propiolic acid compound. In this connection the solvent or diluent is selected on the basis of being the least compatible or having the poorest solvency for hydrogen halide. The preferred solvents or diluents for this purpose may be the cycloalkanes, e.g., cyclohexane, cyclopentane or the alkyl substituted cycloalkanes, etc., and the halogenated hydrocarbons.

When using the acetylenic acid as the starting material in the esterification reaction, water is formed as a by-product material. Since the reaction is of the equilibrium type, it is preferred that the by-product water be removed continuously during the course of the reaction in order to have the equilibrium shift in the desired direction. The solvent or diluent employed in the reaction may be selected on the basis that it will form an azeotrope with water or that it boils above water, and thus the temperature of reaction can be maintained at a level which facilitates removal of the water without affecting the solvent or diluent. Considering the prerequisites of a solvent or diluent, generally any organic material which is non-reactive with either the reactants or the product materials may be employed. The quantity of solvent or diluent employed in the reaction varies considerably depending upon the result which is desired. In some instances it may be desirable to employ a relatively small quantity of diluent as compared to the amount of reactants which are being used, whereas in other cases it may be desirable to use a relatively large quantity of solvent or diluent to facilitate intermixing of the reactants.

We have also found that when effecting the reaction with the free acid or the acid anhydride as the acetylenic acid component, it is advantageous to operate in the presence of an acidic material as catalyst. Acids which are useful for this purpose are, e.g., the mineral acids such as sulfuric, hydrochloric, nitric or phosphoric acid, or chlorosulfonic acid, acidic salts such as ferric chloride or magnesium bisulfate, organic sulfonic acids such as benzenesulfonic acid or 4-toluenesulfonic acid, etc.

Acetylenic esters provided by the invention are, e.g., the monoesters of polyols such as the propiolate, tetrolate, 2-hexynoate, 2-octynoate, phenylpropiolate, 1-naphthylpropiolate of such polyols as ethylene glycol, propylene glycol, 2,3-dimethyl-1,3-pentanediol, 1,4-butanediol, 1,2-hexanediol, 2-bromo-1,3 - propanediol, 1,3 - dichloro-2,3-butanediol, 2,5-diheptanediol, 2-methyl-2-octane-1,4-diol, 1,2-dodecanediol, 5-decyne-4,7 - diol, glycerine, 1,2,3,6-hexanetetrol, 4,7-dipropyl-5-decyne-3,4,7,8-tetrol, 1,9,10-octadecanetriol, 2-(hydroxymethyl) - 2 - methylpropanediol, erythritol, pentaerythritol, pyrocatechol, 1,2-diphenyl-1,2-ethanediol, 3,6-dimethyl-O-xylene-α,α'-diol, 1,2,4-benzenetriol, p,p'-diphenol, 1,2-naphthalenediol, 1,2-dimethyl-1,2-cyclohexanediol, 1,3,5-cyclohexanetriol, 1,2-cyclopentanedimethanol, cyclohexyl-1,2-ethanediol, etc.

As examples of the presently provided di-, tri-, or tetra-esterified polyols are:

3-butene-1,4-diol dipropiolate
Ethylene glycol ditetrolate
2,3-dimethyl-1,3-pentanediol di-2-pentynoate
Propylene glycol dipropiolate
2-methyl-1,5-pentanediol bis(phenylpropiolate)
2-heptene-1,6-diol dipropiolate
1,6-methyl-1,2-heptadecanediol di-2-pentynoate
Hydroquinone dipropiolate
o-Benzenediethanol bis(phenylpropiolate)
1-phenyl-1,2-propanediol dipropiolate
Glycerine dipropiolate
Glycerine tripropiolate
4-ethyl-1,4,5-heptanetriol dipropiolate
4,4-dichloro-o,o'-biphenol dipropiolate
Pyrogallol tri-2-heptynoate
1,2,3,4-benzenetetrol tetrapropiolate
2,3,6,7-tetramethyl-2,3,6,7-octanetetrol trietrolate
Phloroglucinol dipropiolate
Pentaerythritol tetrapropiolate
Dicyclo-p,p'-hexanol dipropiolate
1,2-cyclopentanediol bis(phenylpropiolate)
4-cyclohexene-1,2-dimethanol di-2-pentynoate
1-methyl-1,2,4-cyclohexanetriol di-2-octynoate
1,1-cyclopropanedimethanol dipropiolate
Cyclohexyl-1,2-ethanediol bis(phenylpropiolate)
3-cyclopentene-1,2-diol bis( 1-naphthalenepropiolate)
Decahydro-2,3-naphthalenedimethanol dipropiolate
2-methyl-1,2-propanediol dipropiolate
1,13-tridecanetriol bis(phenylpropiolate)
2-methyl-2-octene-1,4-diol dipropiolate
1,6-hexanediol bis(4-tolylpropiolate)

A convenient method of preparing partial esters having an alkynoate or arylalkynoate radical is by the addition reaction of an alkylene oxide with the acetylenic acid, thus:

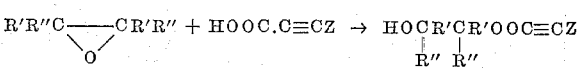

where R' and R" are selected from the class consisting of hydrogen and alkyl radicals of from 1 to 5 carbon atoms and Z is selected from the class consisting of hydrogen, alkyl radicals of from 1 to 5 carbon atoms and aryl radicals of 6 to 10 carbon atoms. Thus the reaction of ethylene oxide and propiolic acid gives 2-hydroxyethyl propiolate:

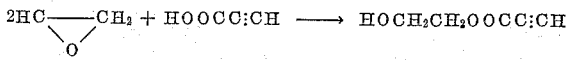

Reaction of the alkylene oxide with the acetylenic acid is conducted by simply introducing the alkylene oxide into a solution or suspension of the acetylenic acid at ordinary or moderately increased temperatures and in the presence or absence of a basic agent as catalyst. Temperatures of from, say, —15° C. to 50° C. are advantageously employed. Basic catalysts useful in the addition reaction are organic or inorganic basic materials generally, e.g., the alkali metal alkoxides such as sodium methoxide, the quaternary ammonium halides, such as trimethylbenzyl ammonium chloride, the heterocyclic bases such as pyridine or quinoline, the alkali metals or the oxides, hydroxies or basic salts thereof such as sodium, potassium, lithium, or rubidium oxide, hydroxide, or carbonate, ammonium hydroxide etc.

Solvents or diluents of general utility are liquids which are inert during the reaction conditions, e.g., the hydrocarbon solvents such as benzene or hexane; the chlorinated hydrocarbons such as carbon tetrachloride or ethylene dichloride; the aliphatic or cyclic ethers such as ethyl ether, butyl methyl ether or dioxane, etc.

Useful alkylene oxides include, e.g., ethylene oxide, propylene oxide, 2,3-epoxy-2,4,4-trimethylpentane, 1,2-epoxy-2-methylpropane, 2,3-epoxybutane, 2,3-epoxypentane, 1,2-epoxy-2,4,4-trimethylpentane, 1,2-epoxypentane, 2,3-epoxyoctane, etc. The useful acetylenic acids are those which are disclosed above to be useful in esterification of polyhydroxy compounds. The partial esters obtained by reaction of the alkylene oxide with the acetylenic acids can be characterized generally as hydroxyalkyl alkynoates or arylalkynoates, e.g., from ethylene oxide and phenylpropiolic acid there is obtained hydroxyethyl phenylpropiolate; from propylene oxide and propiolic acid there is obtained a mixture of 2-hydroxypropyl and 1-(hydroxymethyl)-ethyl propiolate (primarily the 2-hydroxy compound); from 2,3-epoxybutane and tetrolic acid there is obtained 1-methyl-2-hydroxypropyl tetrolate; from 1,2-epoxypentane and 2-butynoic acid there is obtained a mixture of 1-(hydroxymethyl) butyl and 2-hydroxypentyl 2-butynoate; from ethylene oxide and naphthalenepropiolic acid there is obtained 2-hydroxyethyl naphthalenepropiolate, etc. The same compounds, of course, can be obtained by mono-esterification with an acetylenic acid, halide or anhydride of the appropriate dihydroxy compound, e.g., 2-hydroxyethyl phenylpropiolate is prepared either by the addition reaction of ethylene oxide with phenylpropiolic acid or by mono-esterification of ethylene glycol with phenylpropiolic acid. Ring opening of the higher alkylene oxides, for the purpose of adding the hydroxyalkyl radical, may take place at either of the carbon atoms which are attached to the epoxy oxygen; hence, in order to obtain isomer-free mono-esters it is generally advisable to prepare the mono-esters of the higher alkylene glycols by working with the acetylenic acid and the glycol rather than the higher alkylene oxide.

The presently provided acetylenic esters of the polyols are stable, well-characterized compounds which are advantageously employed for a variety of industrial and agricultural purposes, e.g., as hardening agents in synthetic rubber manufacture processes; as plasticizers for vinyl polymers, as mold-release agents in the plastics industry; as hypnotics and soporifics in the pharmaceutical industry; and, as hereinbefore disclosed, as toxicant compositions effective in preventing or inhibiting the growth of plants and micro-organisms.

The preparation of the compounds used in this invention is further illustrated by, but not limited to, the following examples:

*Example 1*

A mixture consisting of 12.4 g. (0.2 mole) of ethylene glycol, 30.8 g. (0.44 mole, 10% excess) of propiolic acid, 5 drops of sulfuric acid and 100 ml. of benzene was stirred at reflux under a Dean-Stark apparatus for 5.5 hours. During this time 7.1 ml. of water had collected (98.5% of theory required for diesterification). The reaction mixture was allowed to cool and then neutralized by adding 0.7 g. of sodium carbonate thereto. After standing overnight the reaction mixture was freed of solid by filtration, and the filtrate was evaporated at water-pump pressure to give 32.8 g. of a pale, yellow oil. This was distilled to give the substantially pure dipropiolate of ethylene glycol, B.P. 90–92° C./0.3 mm., $n_D^{25}$ 1.4618, which analyzed 57.56% carbon and 3.85% hydrogen as against 57.83% and 3.64%, the calculated values. Infrared analysis showed the following structures:

$\equiv$CH at 3220 cm.$^{-1}$
CH aliphatic at 2900 cm.$^{-1}$
C$\equiv$C at 2100 cm.$^{-1}$ $\overset{O}{\underset{\parallel}{C}}$ ester at 1700 cm.$^{-1}$ CH$_2$ at 1450 cm.$^{-1}$
C—O-ester at 1240 cm.$^{-1}$

*Example 2*

A mixture consisting of 21.0 g. (0.3 mole) of propiolic acid, 0.5 g. of tetraethylammonium bromide and 100 ml. of ether was charged to a flask fitted with stirrer, thermometer, gas inlet tube and Dry Ice condenser. To the stirred mixture there was admitted about 14.5 g. (0.33 mole) of ethylene oxide along with nitrogen while holding the temperature of the reaction mixture at from −5° to 0° C. Addition of the gas was carried out over a 1 hour period; during this time there was noted no noticeable exothermic reaction. The whole was then stirred at a temperature of 5–15° C. for 1 hour and then allowed to warm slowly to room temperature under nitrogen. After being allowed to stand at room temperature overnight, the reaction mixture, being strongly acidic, was treated with an additional 5 g. of ethylene oxide at room temperature. During the 20 minute period in which the introduction of the additional ethylene oxide was conducted, the temperature of the reaction rose from 16° to 24° C. The ether was then evaporated from the reaction mixture and there was obtained as residue a pale, yellow oil which upon distillation gave 2-hydroxyethyl propiolate, B. P. 66–68° C./0.5 mm., $n_D^{25}$ 1.4513, analyzing 52.93% carbon and 5.51% hydrogen as against 52.63% and 5.30% the respective calculated values. Infrared analysis gave the following structures:

OH at 3400 cm.$^{-1}$
$\equiv$CH at 3200 cm.$^{-1}$
C$\equiv$CH at 2100 cm.$^{-1}$
C$\equiv$O at 1700 cm.$^{-1}$
C—O-ester at 1240 cm.$^{-1}$
C$\equiv$CH at 758 cm.$^{-1}$
CH aliphatic at 2900 cm.$^{-1}$

*Example 3*

A mixture of 15.4 g. of propiolic acid, 10.4 g. of 2,2-dimethyl-1,3-propanediol, 100 ml. of benzene and 2 ml. of concentrated sulfuric acid was stirred under refluxing conditions in a flask equipped with a Dean-Stark column. At the end of the reaction, which took about 2 hours, it was found that 3.4 ml. of water had been recovered from the overhead distillate. The reaction mass was allowed to cool to room temperature and then washed with 2 portions of 10% aqueous solution of sodium bicarbonate and then with 2 portions of distilled water. Thereafter, it was subjected to distillation treatment to remove the benzene, leaving a pale yellow solid having a melting point of 60–62° C. The solid product was recrystallized from a hexane solution to give the substantially pure dipropiolate of 2,2-dimethyl-1,3-propanediol, M.P. 63–64° C., and analyzing 63.25% carbon and 5.85% hydrogen as against 63.45% and 5.81%, the respective calculated values. Infrared analysis was likewise confirmatory of the dipropiolate.

*Example 4*

A mixture of 23.1 g. of propiolic acid, 12 g. of 2-(hydroxymethyl)-2-methyl-1,3-propanediol, 100 ml. of benzene and 1 ml. of concentrated sulfuric acid was stirred under refluxing conditions in a flask equipped with a Dean-Stark column. After the reaction mass had refluxed for a period of 4 hours, it was found that 6.5 ml. of water had been separated from the overhead distillate. The reaction mass was then cooled and washed with 50 ml. of 10% aqueous solution of sodium bicarbonate. The benzene was removed from the reaction mass by evaporation, leaving a yellow oil. Upon standing, the yellow oil crystallized into long pale yellow needles, M.P. 78–81° C. Recrystallization from carbon tetrachloride yielded 23.5 g. of the substantially pure tripropiolate of 2-(hydroxymethyl)-2-methyl-1,3-propanediol, M.P. 83–84° C., analyzing 60.84% carbon and 4.60% hydrogen as against 60.87% and 4.38%, the respective calculated values.

*Example 5*

A mixture of 70 g. of propiolic acid and 281 g. of benzoyl chloride was distilled so that the overhead product of propiolyl chloride was charged directly to a flask containing a suspension of 18.0 g. of 4,4′-isopropylidenedicyclohexanol in 200 ml. of benzene. When all of the generated propiolyl chloride had been introduced, the reaction mixture of 4,4'-isopropylidenedicyclohexanol, propiolyl chloride and benzene was heated to 75° C. At this point all of the suspended solids were completely dissolved in the reaction mass. The reaction mass was held for an additional 1 hour at a temperature of 70° C. and then cooled to ambient temperature while being stirred. Benzene was removed from the reaction mass by evaporation, leaving a pale yellow oil. The oil product was then washed with 250 ml. of boiling hexane to give, on cooling, a colorless solid product. This was then taken up in two liters of hexane and the resulting solution was evaporated to a volume of 350 ml. On cooling a colorless solid having a melting point of 175–200° C. was obtained. Recrystallization from boiling hexane gave the substantially pure dipropiolate of 4,4'-isopropylidenedicyclohexanol, M.P. 200–207° C., and analyzing 73.31% carbon and 7.95% hydrogen as against 73.22% and 8.19% the respective calculated values. The constitution of the product was confirmed by infrared analysis.

*Example 6*

A mixture consisting of 32.0 g. (0.2 mole) of 2-ethyl-2-butyl-1,3-propanediol and 150 ml. of benzene was stirred at reflux to remove any water from the diol. The mixture was then cooled slightly and there was added thereto a mixture consisting of 30.8 g. (0.44 mole) of propiolic acid and 5 drops of sulfuric acid. The reaction mixture was stirred at reflux for 7 hours. At the end of 5 hours, 5.9 ml. of water had evolved and at the end of the 7 hour reflux period, 6.4 ml. of water (84% of that calculated for di-esterification) had evolved. Ether (100 ml.) was added to the reaction mixture and the resulting orange solution was washed with 100 ml. of 10% sodium bicarbonate and 100 ml. of distilled water. Solvent evaporation followed by distillation in a Vigruex column gave 37.6 g. of the dipropiolate of 2-ethyl-2-butyl-1,3-propanediol, B.P. 116–117° C./0.3–0.2 mm., and analyzing 68.36% carbon and 7.96% hydrogen as against 68.16% and 7.63%, the calculated values.

*Example 7*

This example shows the use of phosphoric acid as catalyst in the preparation of the dipropiolate of 2,2-dimethyl-1,3-propanediol. A mixture consisting of 7.7 g. (0.11 mole, 10% excess) of propiolic acid, 5.2 g. (0.05 mole) of the glycol, 100 ml. of benzene and 5 drops of 85% aqueous phosphoric acid was stirred at reflux in a Dean-Stark equipped apparatus, for a total of 15 hours, at the end of which time no evolution of water was noted. The reaction mixture was then washed with 10% aqueous sodium bicarbonate and with water, and evaporated to give as residue 4.2 g. of a pale, yellow oil which comprises the dipropiolate of 2,2-dimethyl-1,3-propanediol.

*Example 8*

A mixture consisting of 17.3 g. (0.1 mole) of 2,2-bis-(chloromethyl)-1,3-propanediol, 15.4 g. (0.22 mole, 10% excess) of propiolic acid, 5 drops of sulfuric acid, and 150 ml. of benzene was heated at reflux under a Dean-Stark apparatus for 12 hours, at the end of which time 5 ml. of water had evolved. The reaction mixture was then allowed to stand overnight. At the end of this time the precipitate which had separated was freed of benzene by evaporation and the resulting buff solid was washed with 150 ml. of 10% aqueous sodium bicarbonate and two 150 ml. portions of water. It was recrystallized from methanol to give the pale yellow, crude dipropiolate of 2,2-bis(chloromethyl)-1,3-propanediol, M.P. 133–35° C., which, after treatment with charcoal in methanol and recrystallization, gave the substantially pure dipropiolate, M.P. 134–5° C., which analyzed 47.68% carbon and 3.87% hydrogen as against 47.68% and 3.64%, the calculated values. Infrared analysis showed the presence of the following structures:

$\equiv$CH at 3200 cm.$^{-1}$
C$\equiv$CH at 2100 cm.$^{-1}$
C$=$O at 1690 cm.$^{-1}$
C—O-ester at 1235 cm.$^{-1}$

*Example 9*

A mixture consisting of 18.6 g. (0.1 mole) of p,p'-biphenol, 8.0 g. (0.2 mole) of sodium hydroxide, 300 ml. of water and 50 ml. of benzene was stirred at 5° C. To the stirred mixture there was added a solution of 18.2 g. (0.206 mole, 3% excess) of propiolyl chloride in 75.0 ml. of benzene over a period of 45 seconds. The temperature rose from 5° C. to 15° C. but dropped rapidly after addition of the chloride was complete. The whole was stirred at 5° C. for 15 minutes and allowed to warm to room temperature while stirring. The reaction mixture was then filtered to give a crude colorless solid, M.P. 130–145° C. The filtrate was extracted with two 125 ml. portions of ether. Evaporation of the ether extract gave a white solid which was combined with the previously obtained solid, M.P. 130–145° C. The combined solids were stirred to a homogeneous, thin paste via magnetic stirring, first with 200 ml. of 5% aqueous sodium hydroxide, then with 200 ml. of a saturated aqueous ammonium chloride solution and finally with two 200 ml. portions of water employing filtration after each stirring. The bulk of the solid thus obtained was dissolved in 500 ml. of boiling ethanol, filtered while hot to remove traces of pasty colorless material, and cooled slowly to room temperature. Filtration gave 16.5 g. of colorless fine needles, M.P. 150.5–153° C. Twice repeated recrystallization from hot ethanol gave the substantially pure dipropiolate of p,p'-biphenol M.P. 152–4°C., analyzing 74.47% carbon and 3.60% hydrogen as against 74.48% and 3.47%, the respective calculated values. Infrared analysis showed the following structures to be present:

$\equiv$CH at 3250 cm.$^{-1}$
C$\equiv$CH at 2120 cm.$^{-1}$
C$=$O ester at 1700 cm.$^{-1}$
C$=$C aromatic at 1600, 1480 cm.$^{-1}$
C—O ester at 1200 cm.$^{-1}$

*Example 10*

A solution consisting of 13.5 g. (0.153 mole) of propiolyl chloride in 50 ml. of benzene was added over a one minute period to a mixture consisting of 19.4 g. (0.085 mole) of 4,4'-isopropylidenediphenol, 7.0 g. (0.175 mole, 3% excess) of sodium hydroxide, 300 ml. of water and 100 ml. of benzene, with rapid stirring at a temperature of 5° C. The reaction mixture was stirred at below 10° C. for about 15 minutes, and allowed to stratify, the organic layer was removed and the aqueous layer was extracted with two 100 ml. portions of ether. The combined ether extract and organic layers were washed with 100 ml. of water and evaporated to give as residue 30.2 g. of a yellow-orange viscous oil. The bulk of this oil was dissolved in 350 ml. of ether and washed first with 100 ml. of ice-cold 5% aqueous sodium hydroxide, then with 100 ml. of saturated aqueous ammonium chloride and finally with two 100 ml. portions of water. Benzene (100 ml.) was added to the washed product and the resulting solution was evaporated. The residual oil was crystallized from absolute ethanol to give the substantially pure dipropiolate of 4,4'-isopropylidenediphenol, M.P. 126–127° C., which upon recrystallization from ethanol gave colorless crystals of the substantially pure dipropiolate, M.P. 127–8° C., which analyzed 75.70% carbon and 5.02% hydrogen as against 75.89% and 4.85%, the respective calculated values. Infrared analysis showed the presence of the following structures:

≡CH at 3250 cm.$^{-1}$
C≡CH at 2120 cm.$^{-1}$
p-subst. at 2000–1650 cm.$^{-1}$
C═O at 1700 cm.$^{-1}$
C═C arom. at 1600,1500 cm.$^{-1}$
C—O-ester at 1220 cm.$^{-1}$
Aromatic subst., ≡CH, crystallinity at 880–700 cm.$^{-1}$

Example 11

A mixture consisting of 13.8 g. (0.1 mole) of p-xylene-α,α′-diol, 15.4 g. (0.22 mole) of propiolic acid, 200 ml. of benzene and 0.3 g. of p-toluenesulfonic acid was stirred at reflux for 7.5 hours. During this time 3.5 ml. of water (97% of theory) collected in the Dean-Stark trap which formed a part of the reaction equipment. To the resulting reaction mixture there was added 100 ml. of ether, and the organic material was washed first with 10% aqueous sodium bicarbonate solution and then with water. Evaporation of the ether and the benzene gave as residue 19.8 g. This was distilled at 0.1 mm. to give the substantially pure dipropiolate of p-xylene-α,α′-diol, B.P. 147–149° C./0.1 mm., a pale yellow solid, M.P. 55–61° C., which analyzed 69.50% carbon and 4.38% hydrogen, as against 69.42% and 4.16%, the respective calculated values for $C_{14}H_{10}O_4$. Infrared analysis showed the following structures:

CH of H—C≡CR at 3250 cm.$^{-1}$
C≡C at 2100 cm.$^{-1}$
C═O ester, conjugated, at 1695 cm.$^{-1}$
C—O of $\overset{O}{\overset{\|}{C}}$—O at 1220 cm.$^{-1}$
C—O of OR at 950 cm.$^{-1}$
2 adjacent protons at 820 cm.$^{-1}$

Example 12

A mixture consisting of 9.7 g. (0.05 mole) of tetramethyl-p-xylene-α,α′-diol, 7.7 g. (0.11 mole) of propiolic acid, 100 ml. of benzene and 0.5 g. of p-toluenesulfonic acid was stirred at reflux for 2 hours in a reaction vessel which was equipped with a Dean-Stark water trap. During this time, 7.6 g. of water collected in the trap. The reaction mixture was filtered to give ca. 18 g. of a colorless solid, M.P. 182–5° C. and evaporation of the filtrate gave 1.5 g. of a buff solid, M.P. 179–83° C. Recrystallization of the combined solids from benzene gave 14.5 g. (97.5% theoretical yield) of the dipropiolate of tetramethyl-p-xylene-α,α′-diol, fine needles, M.P. 194–198° C. (with slight blackening), and (after drying in vacuo) analyzing 72.32% carbon and 6.21% hydrogen as against 72.46% and 6.08%, the calculated value for $C_{18}H_{18}O_4$. Infrared analysis showed the following structures:

CH of H—C≡R at 3200 cm.$^{-1}$
C≡C at 2100 cm.$^{-1}$
C═O ester at 1690 cm.$^{-1}$
C—O-ester at 1240 cm.$^{-1}$

Example 13

A mixture consisting of 5.9 g. (0.043 mole) of 4-(2-hydroxyethyl)phenol, 4.2 g. (0.06 mole) of propiolic acid, 100 ml. of benzene and 2 drops of sulfuric acid was stirred at reflux under a Dean-Stark apparatus for 6 hours. During this time 0.8 ml. (100% of theory) of water had evolved. After the reaction mixture had attained room temperature it was washed with two 100 ml. portions of 10% sodium bicarbonate and three 100 ml. portions of distilled water. Evaporation yielded 6.7 g. (82% theoretical yield) of a yellow oil which upon distillation gave the substantially pure mono-propiolate of 4-(2-hydroxyethyl)phenol, B.P. 140°/0.2 mm., $n_D^{25}$ 1.5389, analyzing 69.26% carbon and 5.59% hydrogen as against 69.46% and 5.30%, the calculated values. Infrared analysis showed the following structures:

OH at 3400 cm.$^{-1}$
≡CH at 3250 cm.$^{-1}$
CH arom. at 3000 cm.$^{-1}$
CH aliph. at 2900 cm.$^{-1}$
C≡CH at 2120 cm.$^{-1}$
$\overset{O}{\overset{\|}{C}}$-ester at 1700 cm.$^{-1}$
C═C arom. at 1600, 1590, 1500 cm.$^{-1}$
C—O-ester+/or phenol at 1240 cm.$^{-1}$
2 adj. protons at 830 cm.$^{-1}$
≡CH at 760 cm.$^{-1}$

Example 14

A mixture consisting of 32.1 g. (0.22 mole, 10% excess) of phenylpropiolic acid, 10.4 g. (0.1 mole) of 2,2-dimethyl-1,3-propanediol, five drops of sulfuric acid, and 200 ml. of benzene was stirred at reflux under a Dean-Stark trap. At the end of 20 hours, 1 ml. of water had collected. Accordingly, 0.5 g. of 4-toluenesulfonic acid monohydrate was added to further catalyze the reaction and heating was continued for another 28 hours, at the end of which time 3.5 ml. of water had been collected (theory, 3.6 ml.). The reaction mixture was then allowed to cool, either was added, and the resulting solution was extracted first with 100 ml. of water, then with 100 ml. of 10% aqueous sodium bicarbonate and finally with 100 ml. of water. Evaporation (employing benzene to drive off the water) gave as residue the substantially pure bis(phenylpropiolate) of 2,2-dimethyl-1,3-propanediol which analyzed 76.37% carbon and 5.85% hydrogen as against 76.65% and 5.59%, the calculated values.

Example 15

A mixture consisting of 4-(2-hydroxyethoxy)phenol (15.4 g., 0.1 mole), propiolic acid (7.7 g., 0.11 mole, 10% excess), 4-toluenesulfonic acid monohydrate (0.5 g.) and benzene (150 ml.) was stirred at reflux in an apparatus equipped with a Dean-Stark trap. After six hours at reflux, substantially the theoretical amount of water required for monoesterification had been collected. Accordingly, heating was discontinued, the reaction mixture was allowed to cool and then washed successively with 100 ml. of 10% sodium bicarbonate and 100 ml. of water. After drying in the presence of benzene and evaporating there was obtained as residue a pale yellow oil which was distilled to give the substantially pure mono-propiolate of 4-(2-hydroxyethoxy)phenol, B.P. 147–153° C./0.4 mm., $n_D^{25}$ 1.5442, analyzing 63.11% carbon and 5.3% hydrogen as against 63.91% and 5.23%, the calculated values.

Example 16

A solution consisting of 14.3 g. (0.16 mole) of propiolyl chloride in 100 ml. of benzene was added to a rapidly stirred mixture consisting of 16.5 g., 0.15 mole) of hydroquinone, 6.0 g. (0.15 mole) of sodium hydroxide, 200 ml. of water and 50 ml. of benzene at 5° C. under a nitrogen atmosphere. During addition of the propiolyl chloride solution, which required 1.25 minutes the temperature of the mixture rose to 10° C. It was stirred at 5° C. for an additional 15 minutes and then allowed to attain room temperature with stirring. Filtration gave 10.3 g. of a colorless solid, M.P. 135–143° C. The filtrate was extracted with two 100 ml. portions of ether and the combined extratcts were evaporated to give a buff solid M.P. 74–104° C. This was combined with the previously obtained solid, M.P. 135–143° C. and the combined material was recrystallized from methanol to give colorless needles of the substantially pure dipropiolate of hydroquinone, M.P. 157–158° C., analyzing 67.00% carbon and 2.96% hydrogen as against 67.29% and 2.82%, the respective calculated values.

Example 17

A solution consisting of 16.7 g. (0.19 mole) of propiolyl chloride in 100 ml. of benzene was added over a 45 second period to a slowly stirred solution consisting of 21.4 g. (0.1 mole) of resorcinol, 8.25 g. (0.206 mole) of sodium hydroxide, 200 ml. water and 50 ml. of benzene. The temperature of the reaction mixture rose from an initial 5° C. to 15° C. during the addition. The whole was then stirred at 5° C. for 15 minutes and then warmed to room temperature within another 15 minutes. The reaction mixture, containing a flocculent, voluminous, colorless solid was filtered and the solid dissolved in 400 ml. of ether. The filtrate was extracted with ether and the combined extract and ether solution was washed first with aqueous 5% sodium hydroxide, then with saturated aqueous ammonium chloride and finally with water. To the washed material there was added 100 ml. of benzene and the whole was evaporated in vacuo to give a colorless oil which solidified upon standing to give the dipropiolate of resorcinol, M.P. 60.5–62° C., analyzing 67.24% carbon and 3.09% hydrogen as against 67.29% and 2.82%, the respective calculated values.

Example 18

A mixture consisting of 17.6 g. (0.2 mole) of 2-butene-1,4-diol, 30.8 g. (0.44 mole, 10% excess) of propiolic acid and 150 ml. of benzene was stirred at reflux under a Dean Stark apparatus for one hour. At the end of that time the reaction mixture was cooled slightly and 0.5 g. of 4-toluenesulfonic acid was added. Heating with stirring was then conducted for 24 hours. After allowing the reaction mixture to cool it was washed first with 100 ml. of 10%% aqueous sodium bicarbonate and then with two 100 ml. portions of water. The washed reaction mixture was diluted with 100 ml. of benzene and the whole evaporated to give as residue 8.4 g. of a yellow, viscous oil. Distillation of the oil gave the substantially pure dipropiolate of 2-butene-1,4-diol, B.P. 104–106° C/0.1 mm. $n_D^{25}$ 1.4798. Infrared analysis showed the presence of the following structures:

$\equiv$CH at 3300 cm.$^{-1}$
CH usat. at 3050 cm$^{-1}$
CH aliph. at 2975 cm.$^{-1}$
C$\equiv$CH at 2125 cm.$^{-1}$
C=O at 1725 cm.$^{-1}$
C—O-ester at 1200 cm.$^{-1}$
$\equiv$CH at 755 cm.$^{-1}$

Example 19

A mixture consisting of 13.6 g. (0.1 mole) of pentaerythritol, 30.8 g. (0.44 mole, 10% excess) of propiolic acid, 1.0 g. of 4-toluenesulfonic acid and 150 ml. of benzene was stirred at reflux under a Dean-Stark apparatus for 5 hours. The resulting pale yellow reaction mixture was allowed to stand at room temperature overnight. It was then diluted with 100 ml. of ether and washed successively, first with two 100 ml. portions of 10% aqueous sodium bicarbonate and two 100 ml. portions of water. To the washed product there was then added 100 ml. of benzene and the whole was subjected to evaporation, first at water-pump pressure and then at high vacuum. Removal of the solvents in this manner gave as residue 35.6 g. of a colorless, gel-like solid which upon twice repeated crystallization from ethanol gave the substantially pure tetrapropiolate of pentaerythritol, M.P. 108.5°–110° C., analyzing 58.89% carbon and 3.76% hydrogen, as against 59.31% and 3.51%, the calculated values. Infrared analysis showed the following structures:

$\equiv$CH at 3400, 3375 cm.$^{-1}$
C$\equiv$CH at 2125 cm.$^{-1}$
C=O at 1725 cm.$^{-1}$
C—O-ester at 1240 cm.$^{-1}$

Example 20

This example shows testing of the following compounds against the fungus *Aspergillus niger*:

(I) Tripropiolate of 2-(hydroxymethyl)-2-methyl-1,3-propanediol (Example 4)
(II) Dipropiolate of 2,2-dimethyl-1,3-propanediol (Example 3)
(III) Dipropiolate of p-xylene-α,α'-diol (Example 11)

The following procedure was used:
An inoculum preparation of *Aspergillus niger* SN-111 was prepared by adding 10 ml. of sterile distilled water to a 7-day old, Sabouraud's dextrose agar slant culture thereof and dislodging the organisms into the water with a transfer needle.

Culture media was prepared by respectively adding 18 ml. of Sabouraud's dextrose agar to 18 x 150 mm. straight side test tubes, capping with metal culture tube caps, and sterilizing in an autoclave for fifteen minutes at 121° C.

Respective stock solutions of the test compounds were prepared by dissolving 100 mg. of said test compound in 10 ml. of acetone: respective 1% acetone solutions of the compounds were thus obtained.

Using a sterile 5 ml. pipette, 2 ml. of said 1% solutions were respectively transferred to a tube of melted, sterile culture media prepared as described above. Dilutions of 1 part of test compound per 1,000 parts of agar resulted. The thus-diluted agars were then poured into sterile Petri dishes and allowed to harden. Two dishes of agar containing the same concentration of acetone but none of the test compound were also prepared and allowed to harden; these were to be used for "controls."

The plates of agar were then respectively inoculated with one drop of the above-described inoculum preparation. Examination of the plates after a five-day incubation period showed no growth of the *Aspergillus niger* in those of the plates which contained either compound I, compound II or compound III, whereas profuse growth of the *Aspergillus niger* was noted in both of the "control" plates.

Example 21

This example shows testing of the following compounds against the bacteria *Staphylococcus aureus* and *Salmonella typhosa*.

(I) Tripropiolate of 2-(hydroxymethyl)-2-methyl-1,3-propanediol (Example 4)
(II) Dipropiolate of 2,2-dimethyl-1,3-propanediol (Example 3)
(III) Dipropiolate of p-xylene-α,α'-diol (Example 11)

The following procedure was used: Respective 1% acetone solutions of the above compounds were prepared and added to sterile, melted nutrient agar to give an 0.1% concentration of the test compound in the agar. These agar solutions of the test compounds were then respectively poured into Petri dishes and allowed to harden. These plates as well as duplicate "controls" (plates of sterile nutrient agar containing the same concentration of acetone but none of the test compound) were respectively inoculated with either the *Staphylococcus aureus* or the *Salmonella typhosa*, and incubated for two days at 37° C. At the end of that time, inspection of the plates showed no growth of either bacillus on those of the plates which contained either compound I, compound II or compound III whereas profuse growth of both of the test organisms was noted on the "controls."

Example 22

Testing of the 2-hydroxyethyl propiolate of Example 2, using substantially the procedure described in Examples 14 and 15, except that the propiolate was used at a concentration of 0.01% showed it to inhibit growth of the following organisms:

S. aureus
B. cereus w. mycoides
B. ammoniagenes
E. coli
E. atrosepetica
S. typhosa
Ps. aeruginosa
B. subtilis
A. niger
P. expansum
F. annosus
C. pilifera
A. oryzae
C. herbarium
M. werrucaria
M. fructicola
L. traber In the above tests nutrient agar was used as the culture medium for bacteria and malt agar was used for the molds.

Subsequent testing of the 2-hydroxyethyl propiolate at a concentration of one part of the propiolate per million parts of the agar showed it to inhibit the growth of *E. atroseptica*, *C. herbarium* and *L. traber*.

*Example 23*

The tripropiolate of 2-(hydroxymethyl)-2-methyl-1,3-propanediol of Example 4 was tested against the fungi *Alternaria solani* (the causal organism of tomato blight) and against *Colletotrichum lagenarium*, the causal agent of cucumber anthracnose. The testing was conducted by spraying to run-off, four uniform, 3-week old Green Prolific cucumber plants with an 0.1% aqueous emulsion of said tripropiolate and spraying, also to run-off, four uniform Bonny Best tomato plants at the 4–5 leaf stage with an 0.01% aqueous emulsion of said tripropiolate, allowing the sprayed plants to dry, subsequently inoculating the cucumber plants with said cucumber fungus and the tomato plants with said tomato fungus, maintaining the thus sprayed and inoculated plants in a moisture chamber at 70° F. for 36 hours, then removing them to a greenhouse bench and periodically inspecting the plants for incidence of the disease during a 5-day period. At the end of this period, the plants were observed to be flourishing and free of disease. On the other hand, controls which had been similarly inoculated and maintained were disease-ridden.

Similar testing of the dipropiolate of 2-ethyl-2-butyl-1,3-propanediol of Example 6 and of the dipropiolate of p-xylene-α,α-diol of Example 11 against said tomato blight fungus at an 0.1% concentration showed these dipropiolates to suppress completely the growth of said fungus.

*Example 24*

The dipropiolate of ethylene glycol of Example 1, the dipropiolate of 2,2-dimethyl-1,3-propanediol of Example 3, the dipropiolate of 2-ethyl-2-butyl-1,3-propanediol of Example 6, and the tripropiolate of 2-(hydroxymethyl)-2-methyl-1,3-propanediol of Example 4 were tested against the soil fungus *Rhizoctonia solani*. Testing was conducted by adding to soil which had been uniformly infected with the fungus a quantity of either the dipropiolate or the tripropiolate which was 0.01% the weight of the soil, thoroughly mixing the whole, incubating at 25° C. for 24 hours, seeding pots of the incubated soil with cotton and cucumber seeds, maintaining the seeded pots for 48 hours at 70° F. and at a high relating humidity (96–98%), removing the pots to the greenhouse, maintaining them there for 2 weeks, and inspecting them for number of seedlings emerged and the condition of the shoots and roots thereof. A similar testing procedure was conducted with "controls," i.e., similarly inoculated soil which had not been chemically treated. A very poor percent emergence and a stunted diseased condition of those of the plants which had emerged was noted in the controls, whereas excellent germination and plant growth was observed in the pots of inoculated soil which had been treated with said dipropiolate or tripropiolate.

Similar testing of the dipropiolate of ethylene glycol of Example 1, of the dipropiolate of 2-ethyl-2-butyl-1,3-propanediol of Example 6 and of the dipropiolate of p-xylene-α,α'-diol of Example 11 against the soil fungus *Pythium ultimum* showed these dipropiolates to inhibit completely the growth of the pythium at a concentration of 0.01%.

The present acetylenic esters are characterized by a high degree of efficacy in that they inhibit growth of bacteria and fungi at even very low concentrations. They are characterized by having a broad spectrum of bactericidal activity, e.g. the dipropiolates are effective against the variety of bacteria as shown in Examples 21 and 22, and they inhibit a variety of fungi such as the causative organisms of cucumber and tomato leaf spot and blight, apple scab, citrus mold, rose leaf spot, wheat rust, etc. Biological toxicant compositions containing the present compounds are advantageously formulated by first preparing a solution thereof in an organic solvent and then adding the resulting solution to water containing an emulsifying agent to form an oil-in-water emulsion. Because of their effectiveness, they are present in the toxicant compositions in only very small concentrations, for example, in concentrations of from 0.0001 percent to 1.0 percent by weight of the total weight of the emulsion. Emulsifying agents which may be employed are those customarily used in the art for the preparation of oil-in-water emulsions. Examples of emulsifying agents which may be used include alkylbenzene-sulfonates, long chained polyalkylene glycols, long chained alkylsulfosuccinates, etc.

While the present compounds are most advantageously employed as biological toxicants by incorporating them into an emulsion as herein described, they may also be incorporated into solid carriers such as clay, talc, pumice or bentonite to give compositions which may be applied either to infested areas or to locale which may be subjected to infestation. They may also be dissolved in liquefied gases such as the fluorochloroethanes or methyl chloride and applied from aerosol bombs containing the solution. Mixtures of the esters may also be used.

This application is a continuation-in-part of copending application Serial No. 38,113, filed June 23, 1960, now U.S. Patent 3,082,242, which issued March 19, 1963.

What I claim is:

1. The method of inhibiting the growth of fungi and bacteria which comprises exposing said fungi and bacteria to a growth inhibiting quantity of a compound of the formula

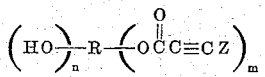

wherein R is selected from the class consisting of hydrocarbon radicals having from 2 to 18 carbon atoms and halohydrocarbon radicals of from 2 to 18 carbon atoms and is linked to any hydroxyl and acetylenic carboxyl moieties through different carbon atoms thereof, with no two of any of said hydroxyl and acetylenic carboxyl moieties being bonded to the same carbon atom, $n$ is an integer of from 0 to 3, $m$ is an integer of from 1 to 4 and the sum of $n$ plus $m$ is from 2 to 4, and Z is selected from the class consisting of hydrogen, alkyl radicals of from 1 to 5 carbon atoms, and aryl radicals of from 6 to 10 carbon atoms.

2. The method of inhibiting the growth of fungi and bacteria which comprises exposing said fungi and bacteria to a growth inhibiting quantity of a compound of the formula

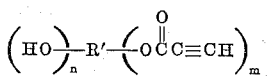

wherein R' is a hydrocarbon radical of from 2 to 18 carbon atoms and is linked to any hydroxyl and acetylenic carboxyl moieties through different carbon atoms thereof with no two of any of said hydroxyl and acetylenic carboxyl moieties being bonded to the same carbon atom, $n$ is an integer of from 0 to 3, $m$ is an integer of from 1 to 4, and the sum of $n$ plus $m$ is from 2 to 4.

3. The method of inhibiting the growth of fungi and bacteria which comprises exposing said fungi and bacteria to a growth-inhibiting quantity of a compound of the formula

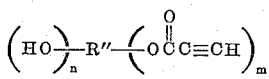

wherein R'' is an alkylene radical of from 2 to 18 carbon atoms and is linked to any hydroxyl and acetylenic carboxyl moieties through different carbon atoms thereof with no two of any of said hydroxyl and acetylenic carboxyl moieties being bonded to the same carbon atom, $n$ is an integer of from 0 to 3, $m$ is an integer of from 1 to 4 and the sum of $n$ plus $m$ is from 2 to 4.

4. The method of inhibiting the growth of fungi which comprises exposing the fungi to a growth inhibiting quantity of the tripropiolate of 2-(hydroxymethyl)-2-methyl-1,3-propanediol.

5. The method of inhibiting the growth of fungi which comprises exposing the fungi to a growth-inhibiting amount of the dipropiolate of 2,2-dimethyl-1,3-propanediol.

6. The method of inhibiting the growth of fungi which comprises exposing the fungi to a growth inhibiting quantity of the dipropiolate of p-xylene-α,α'-diol.

7. The method of inhibiting the growth of bacteria which comprises exposing said bacteria to a growth inhibiting amount of the tripropiolate of 2-(hydroxymethyl)-2-methyl-1,3-propanediol.

8. The method of inhibiting the growth of bacteria which comprises exposing said bacteria to a growth inhibiting amount of the dipropiolate of 2,2-dimethyl-1,3-propanediol.

9. The method of inhibiting the growth of bacteria which comprises exposing said bacteria to a growth inhibiting amount of the dipropiolate of p-xylene-α,α'-diol.

References Cited in the file of this patent
UNITED STATES PATENTS

| | | |
|---|---|---|
| 2,082,790 | Cherry | June 8, 1937 |
| 2,370,572 | Muskat et al. | Feb. 27, 1945 |
| 2,484,487 | Caldwell | Oct. 11, 1949 |
| 2,600,275 | Smith | June 10, 1952 |
| 2,692,256 | Bauer et al. | Oct. 19, 1954 |

FOREIGN PATENTS

| | | |
|---|---|---|
| 118,774 | Australia | Aug. 7, 1944 |

OTHER REFERENCES

Heaton et al.: J.A.C.S., vol. 71, pages 2948-2949 (1949).